United States Patent
Steele, III et al.

(10) Patent No.: US 12,113,875 B1
(45) Date of Patent: Oct. 8, 2024

(54) APPARATUS AND METHOD FOR DATA CONVERSION

(71) Applicant: Quick Quack Car Wash Holdings, LLC, Roseville, CA (US)

(72) Inventors: Joseph Allen Steele, III, Plumas Lake, CA (US); Josh David Schumacher, Sacramento, CA (US); Mark Daniel Adams, Roseville, CA (US); Betsy Danielle Urschel, Germantown, TN (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/196,238

(22) Filed: May 11, 2023

(51) Int. Cl.
*H04L 67/50* (2022.01)
*G06V 30/148* (2022.01)

(52) U.S. Cl.
CPC .......... *H04L 67/535* (2022.05); *G06V 30/153* (2022.01)

(58) Field of Classification Search
CPC ....... H04L 67/535; H04L 43/04; H04L 43/06; G06V 30/153
See application file for complete search history.

(56) References Cited

U.S. PATENT DOCUMENTS

| | | | | |
|---|---|---|---|---|
| 11,704,500 B2 * | 7/2023 | Salimov | ............. | G06N 20/20 704/9 |
| 2011/0202821 A1 * | 8/2011 | Roy | ............. | G06Q 30/02 715/201 |
| 2014/0188675 A1 | 7/2014 | Brown | | |
| 2014/0188784 A1 | 7/2014 | Guerra | | |
| 2014/0226010 A1 * | 8/2014 | Molin | ............. | G07C 5/008 340/576 |
| 2014/0331127 A1 * | 11/2014 | Chang | ............. | G06F 40/186 715/271 |
| 2016/0176410 A1 * | 6/2016 | Darowich | ............. | B60W 40/09 340/439 |
| 2018/0074797 A1 * | 3/2018 | Ludwig | ............. | G06F 16/00 |
| 2018/0375884 A1 * | 12/2018 | Kopp | ............. | G06F 21/552 |
| 2020/0058079 A1 * | 2/2020 | Hosp | ............. | G06Q 40/128 |
| 2022/0027380 A1 | 1/2022 | Martin | | |
| 2022/0029977 A1 * | 1/2022 | Sogawa | ............. | H04L 63/083 |
| 2022/0108334 A1 * | 4/2022 | Chauhan | ............. | G06Q 30/0202 |
| 2022/0157421 A1 * | 5/2022 | Chawla | ............. | H04L 67/12 |
| 2022/0405499 A1 * | 12/2022 | Amin | ............. | G06V 40/394 |
| 2023/0021052 A1 * | 1/2023 | Salimov | ............. | G06F 40/35 |

FOREIGN PATENT DOCUMENTS

CN 115168460 A 10/2022

* cited by examiner

*Primary Examiner* — Ramy M Osman
(74) *Attorney, Agent, or Firm* — Caldwell Intellectual Property Law

(57) ABSTRACT

An apparatus and method for converting data is disclosed. The apparatus includes at least a processor and a memory communicatively connected to the at least a processor, wherein the memory contains instructions configuring the at least a processor to extract, using a data extraction module, user activity data from user device data, classify the user activity data into one or more user activity data groups, convert, using a data converting module, the user activity data to system data as a function of the one or more user activity data groups and generate, using a report generation module, a user activity report as a function of the system data.

18 Claims, 8 Drawing Sheets

APPARATUS AND METHOD FOR DATA CONVERSION

FIELD OF THE INVENTION

The present invention generally relates to the field of data conversion. In particular, the present invention is directed to apparatus and method for converting data.

BACKGROUND

The automotive industry has undergone significant growth in recent years, with millions of vehicles on the roads worldwide. However, existing technologies are often complex, time-consuming, and prone to errors. A new system and method for transforming data is needed.

SUMMARY OF THE DISCLOSURE

In an aspect, apparatus for converting data is disclosed. The apparatus includes at least a processor and a memory communicatively connected to the at least a processor, wherein the memory contains instructions configuring the at least a processor to extract, using a data extraction module, user activity data from user device data, classify the user activity data into one or more user activity data groups, convert, using a data converting module, the user activity data to system data as a function of the one or more user activity data groups and generate, using a report generation module, a user activity report as a function of the system data.

In another aspect, a method for converting data is disclosed. The method includes extracting, using at least a processor and a data extraction module, user activity data from user device data, classifying, using the at least a processor, the user activity data into one or more user activity data groups, converting, using the at least a processor and a data converting module, the user activity data to system data as a function of the one or more user activity data groups, generating, using the at least a processor and a report generation module, a user activity report as a function of the system data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for converting data. The apparatus includes at least a processor and a memory communicatively connected to the at least a processor, wherein the memory contains instructions configuring the at least a processor to extract, using a data extraction module, user activity data from user device data, classify the user activity data into one or more user activity data groups, convert, using a data converting module, the user activity data to system data as a function of the one or more user activity data groups and generate, using a report generation module, a user activity report as a function of the system data.

Figure 1:
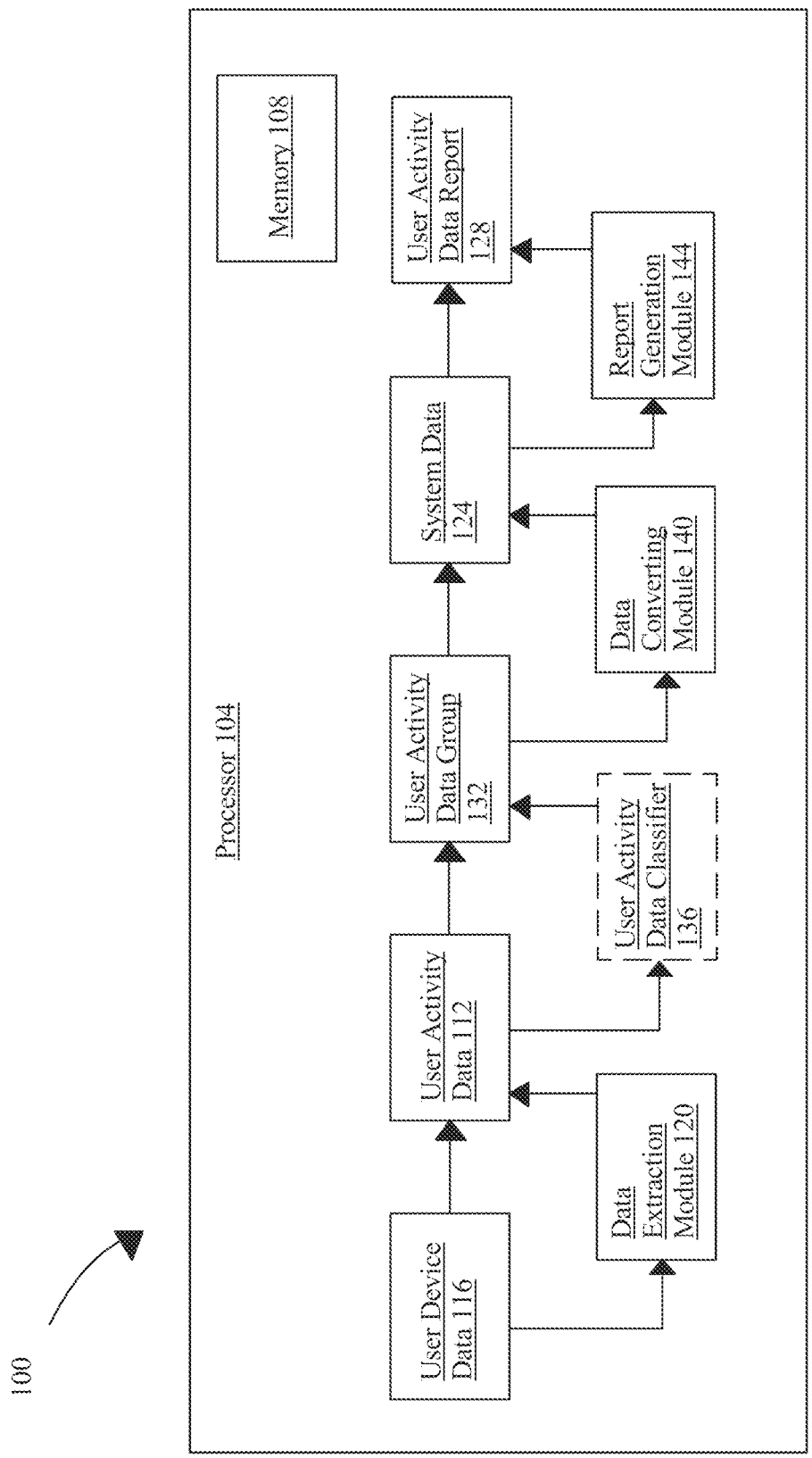
FIG. 1 is a block diagram of an exemplary embodiment of a system for converting data.

Referring now to FIG. 1, an illustration of an exemplary embodiment of an apparatus 100 for converting data is illustrated. The apparatus 100 includes at least a processor 104. The at least a processor 104 may include, without limitation, any processor described in this disclosure. The at least a processor 104 may be included in a computing device. The at least a processor 104 may include any computing device as described in this disclosure, including without limitation a microcontroller, microprocessor, digital signal processor (DSP) and/or system on a chip (SoC) as described in this disclosure. The at least a processor 104 may include, be included in, and/or communicate with a mobile device such as a mobile telephone or smartphone. The at least a processor 104 may include a single computing device operating independently, or may include two or more computing device operating in concert, in parallel, sequentially or the like; two or more computing devices may be included together in a single computing device or in two or more computing devices. The at least a processor 104 may interface or communicate with one or more additional devices as described below in further detail via a network interface device. Network interface device may be utilized for connecting the at least a processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The at least a processor 104 may include but is not limited to, for example, a computing device or cluster of computing devices in a first location and a second computing device or cluster of computing devices in a second location. The at least a processor 104 may include one or more computing devices dedicated to data storage, security, distribution of traffic for load balancing, and the like. The at least a processor 104 may distribute one or more computing tasks as described below across a plurality of computing devices of computing device, which may operate in parallel, in series, redundantly, or in any other manner used for distribution of tasks or memory between computing devices. The at least a processor 104 may be implemented, as a non-limiting example, using a "shared nothing" architecture.

With continued reference to FIG. 1, at least a processor 104 may be designed and/or configured to perform any method, method step, or sequence of method steps in any embodiment described in this disclosure, in any order and with any degree of repetition. For instance, the at least a processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The at least a processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 108 communicatively connected to at least a processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, a memory 108 contains instructions configuring at least a processor 104 to extract user activity data 112 from user device data 116 using a data extraction module 120. For the purposes of this disclosure, "extracting" is the process of analyzing data and identifying the relevant information contained within it. For the purposes of this disclosure, a "data extraction module" is a module or a software component that is configured to extract user activity data from user device data. For the purposes of this disclosure, "user device data" is data that is received from a user device. In some embodiments, the user device data may include image data as described below. As a non-limiting example, the user device data 116 may include document scanned or captured by the user device. As a non-limiting example, the user device data 116 may be received from a cash register that includes a POS. As another non-limiting example, when a user pays for a service in a vehicle maintenance system using a personal device of the user, the user device data 116 may be received. For example and without limitation, when the user uses a car wash service and a vending machine to buy a coolant for the user's car and pays for them using an application (app) the user's smartphone, the user device data 116 can be received from the smartphone and the user activity data 112 may be extracted, where the user activity data 112 may include user billing information and user system activity data that includes a list of services the user used, a name of the coolant the user bought, a price of the car wash service, a price of the coolant. For the purposes of this disclosure, an "application," also called "app" of a mobile device is a software program designed to perform a specific function or set of functions on a mobile device. In some embodiments, the app may be configured to receive the user's input. As a non-limiting example, the user may input user information, user billing information and user system activity data into the app. As another non-limiting example, the user may make a payment using the app. In another embodiment, when the user purchases a product by tapping a credit card to a RFID reader for purchasing a tool for a vehicle cleaning, the user device data 116 may be received and be parsed, then the user activity data 112 may include user billing information, a name of the tool the user bought and a price of the tool. In some embodiments, a user manually input the user device data 116 using a user device. As a non-limiting example, the user may manually input user device data 116 using a shared device such as but not limited to a tablet.

With continued reference to FIG. 1, for the purposes of this disclosure, a "user device" is any device a user uses to manage sales transactions or to process payments. For the purposes of this disclosure, a "user" is any individual, group or company that is using or has used an apparatus. As a non-limiting example, the user may include a driver of a vehicle, a passenger of the vehicle, a car wash employee, a car wash employer, a technician, a customer of the carwash, a sales manager, an accountant, a financial advisor, a cashier, and the like. In some embodiments, the user may input user device data 116 using the user device. In some embodiments, the user device may be configured to receive the user device data 116. In some embodiments, the user device may be configured to display the user device data 116 as described below. In some embodiments, the user device may be configured to display a user activity report 128 as described below.

With continued reference to FIG. 1, in an embodiment, a user device may include a personal device. For the purposes of this disclosure, a "personal device" is any device personally owned by a user. As a non-limiting example, the personal device may include a laptop, tablet, mobile phone, smart watch, or things of the like. In some embodiments, the user device may include an interface configured to receive inputs from the user. In some embodiments, the user may have a capability to process, store or transmit any information independently. In another embodiment, the user device may include a shared device. For the purposes of this disclosure, a "shared device" is a device that is designed for use by multiple users. In some embodiments, the shared device may be used by different users at different times. As a non-limiting example, the shared devices may include desktop computers, kiosks, screens, tablets, or the like.

With continued reference to FIG. 1, in another embodiment, a user device may include a point of sale (POS). For the purposes this disclosure, a "point of sale" is a system that is configured to manage sales transactions and process payments. In some embodiments, the POS may include a software running on a hardware such as but not limited to a mobile phone, tablet, laptop, desktop, and the like. As a non-limiting example, the POS may be implemented in a personal device. As another non-limiting example, the POS may be implemented in a shared device. In some embodiments, the POS may be configured to receive user device data 116 from a user as described below. In some embodiments, the POS may be configured to retrieve the user activity data from a user database. In some embodiments, the POS may include a service price, service information, and the like. As a non-limiting example, the service may include a service provided by a vehicle maintenance system. For the purposes of this disclosure, a "vehicle maintenance system" is a system that conduct a service, repair, or maintenance of a vehicle. As a non-limiting example, the vehicle maintenance system may include washing a vehicle, wiping the vehicle, vacuuming, providing a product for cleaning, repairing and/or maintenance of the vehicle, inflating a tire of the vehicle, changing oil of the vehicle, and the like. For example and without limitation, the product for cleaning, repairing and/or maintenance of the vehicle may be provided using a vending machine. For the purposes of this disclosure, a "vending machine" is a machine that dispenses products for cleaning, repairing and/or maintenance of a vehicle. In some embodiments, the vending machine may dispense snacks, beverages, cigarettes, lottery tickets, or even personal hygiene products for the user. Additional disclosure related to the vehicle maintenance system may be found in U.S. patent application Ser. No. 18/196,147, filed on May 11, 2023, entitled as "METHODS AND APPARATUSES FOR CAR WASH USER EXPERIENCE," the entirety of which is incorporated as a reference.

With continued reference to FIG. 1, in some embodiments, a POS may include a cash register. For the purposes of this disclosure, a "cash register" is a mechanical or electronic device that is configured to process sales transactions and manage cash. As a non-limiting example, when a customer makes a purchase, a cashier may enter the details of the sale, such as the item(s) purchased, the price, and the amount of money tendered by the customer. The cash register, as a non-limiting example, then may calculate the total amount due, and the customer can pay by cash, credit/debit card, or other payment method. The cash register, as a non-limiting example, may keep a record of the transaction, including the date, time, and details of the sale, as well as any change given to the customer.

With continued reference to FIG. 1, in another embodiment, a user device and/or apparatus 100 may include an accounting system. For the purposes of this disclosure, an "accounting system" is a system that is configured to manage financial transactions and related processes. In some embodiments, a user device may include the accounting system. In some embodiments, the accounting system may be configured to receive system data 124 from a user database. The system data 124 disclosed herein is further described below. In some embodiments, the accounting system may be configured to receive the system data 124 that is converted from user activity data 112. In some embodiments, the accounting system may be configured to generate and/or display a user activity report 128 as described below. In some embodiments, the accounting system may be configured to display the system data 124 as described below. In some embodiments, a user may manually input the system data 124 into the accounting system using the user device.

With continued reference to FIG. 1, in another embodiment, a user device and/or apparatus 100 may include a scanning device. For the purposes of this disclosure, a "scanning device" is a device for scanning a unique identifier. In some embodiments, the scanning device may be implemented in a POS. In some embodiments, the scanning device may include an illumination system, a sensor, and a decoder. The sensor in the scanning device may detect the reflected light from the illumination system and may generate an analog signal that is sent to the decoder. The decoder may interpret that signal, validate the unique identifier using the check digit, and convert it into text. This converted text may be delivered by the scanning device to a computing device holding a database of any information of a service, user, and the like. As a non-limiting example, the scanning device may include a pen-type reader, laser scanner, camera-based reader, charge-coupled device (CCD) reader, omnidirectional barcode scanner, and the like. For example without limitation, the scanning device may include a mobile device with an inbuild camera such as without limitation, a phone, a tablet, a laptop, and the like. For example without limitation, a user may use a camera on a phone to scan a barcode. In some embodiments, the scanning device may include wired or wireless communication.

With continued reference to FIG. 1, as used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared.

With continued reference to FIG. 1, in some embodiments, a camera may be configured to generate image data. As used in this disclosure, "image data" is information representing at least a physical scene, space, and/or object (e.g., a user or user's eyes). "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. In some embodiments, the image data may be used for vehicle profiling. Additional disclosure related to the vehicle profiling may be found in U.S. patent application Ser. No. 18/195,760, filed on May 10, 2023, entitled "APPARATUS AND METHOD OF VEHICLE PROFILING," the entirety of which is incorporated as a reference.

With continued reference to FIG. 1, in some embodiments, image data may include an image of a receipt, document, credit card, debit card, unique identifier, and the like. For the purposes of this disclosure, a "receipt" is a document that provides evidence of a financial transaction. In some embodiments, the receipt may include a printed form, a digital form, and the like. As a non-limiting example, the camera may generate the image data by capturing the printed form of the receipt. For example, and without limitation, at least a processor 104 may extract user activity data 112 from the receipt using an optical character recognition (OCR) as described in the entirety of this disclosure. As another non-limiting example, the digital form of the receipt may be stored in a user database and retrieved from the user database. For the purposes of this disclosure, "document" is a recorded or written representation of information that can be used as evidence or as an official record. In some embodiments, the document may include a form of paper or electronic files. As a non-limiting example, the document may include text documents, spreadsheets, images, videos, audio recordings, or the like. As a non-limiting example, the document may include a survey, questionnaire, or any document thereof. For example, and without limitation, the at least a processor 104 may extract the user activity data 112 from the document using an optical character recognition (OCR) as described in the entirety of this disclosure.

With continued reference to FIG. 1, in some embodiments, a scanning device may include a radio frequency identification (RFID) reader. For the purposes of this disclosure, a "radio frequency identification reader" is a device that emits radio waves and receives data transmitted by an RFID tag. In some embodiments, the RFID reader may be connected to a computer device that can process the data received from the RFID tag. For the purposes of this disclosure, "radio frequency identification tag" is a small electronic device that contains a unique identifier and can be attached to or embedded in an object or person. The unique identifier disclosed herein is further described below. The RFID tag may be also referred as an RFID transponder. In some embodiments, the RFID tag may include a passive RFID tag or active RFID tag. For the purposes of this disclosure, a "passive RFID tag" is an RFID tag that doesn't have its own power source and relies on the energy from a RFID reader to transmit its data. For the purposes of this disclosure, an "active RFID tag" is an RFID tag that has its own power source and can transmit its data without relying on an RFID reader's energy. In some embodiments, the RFID tag may be implemented on a vehicle. In some embodiments, the RFID tag may be implemented on a user device. In some embodiments, the RFID tag may be implemented on an identification (ID) card. When an RFID tag comes into the range of the RFID reader, the RFID tag may receive the radio waves emitted by the RFID reader and may use the energy from the waves to transmit its unique identifier back to the RFID reader. The RFID reader then may capture the unique identifier and may send it to the computer device and/or the at least a processor, which can use it for various purposes such as tracking sales transactions, payment process, and the like.

With continued reference to FIG. 1, for the purposes of this disclosure, a "unique identifier" is an identifier that is unique for an object among others. As a non-limiting example, the unique identifier may include a universal product code (barcode), radio-frequency identification (RFID) cryptographic hashes, primary key, a unique sequencing of alpha-numeric symbols, or anything of the like that can be used to identify user activity user. For the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two-dimensional ways to represent information. As a non-limiting example, the matrix barcode may include quick response (QR) code, and the like. The unique identifier may take the form of any identifier that uniquely corresponds to the purposes of apparatus 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate. In an embodiment, the unique identifier may include a printed form. As a non-limiting example, the unique identifier may be printed and sticked on a load. As another non-limiting example, the unique identifier may be printed and tagged on a load. As another non-limiting example, a user may have a printed unique identifier on a paper. In another embodiment, the unique identifier may include a digital form. As a non-limiting example, a user may find the unique identifier on a phone screen, tablet, computer screen, or any display device thereof. As a non-limiting example, a user may find the unique identifier on a phone screen. In an embodiment, the unique identifier may be used to keep track of a user. In another embodiment, the unique identifier may be used to keep track of sales transactions of one or more users. In an embodiment, the unique identifier may be used to keep track of the user's activity in the apparatus 100. For example, without limitation, the unique identifier may be used to keep track of payments, vehicle maintenance, vehicle information, user information, and the like.

With continued reference to FIG. 1, in some embodiments, a user device may be configured to display user device data 116, user activity data 112, system data 124, user activity report 128, and the like. In some embodiments, a user may input data related to the user device data 116, the user activity data 112, the system data 124, the user activity report 128 using a user interface. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, the user may interact with user interface in virtual reality. In some embodiments, the user may interact with the user interface using a computing device distinct from and communicatively connected to an apparatus 100. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this may include pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application such as without limitation a dialog box for the users to customize their computer screen appearances. User interface controls may include software components that a user interacts with through direct manipulation to read or edit information displayed through user interface. Widgets may be used to display lists of similar items, navigate the system using links, tabs, and manipulate data using check boxes, radio boxes, and the like.

With continued reference to FIG. 1, for the purposes of this disclosure, "user activity data" is data related to a user and an activity related to the user. In an embodiment, the user activity data 112 may include user information. For the purposes of this disclosure, "user information" is information related to a user. As a non-limiting example, the user information may include name, gender, date of birth, residency, religion, organ donation, driver history, occupation, family, contact information, emergency contact, and the like. In another embodiments, the user activity data 112 may include user billing information. For the purposes of this disclosure, "user billing information" is information of a user's payment method. As a non-limiting example, the user billing information may include payment method preference, payment history, credit card information, debit card information, and the like. For the purposes of this disclosure, "card information" is information related to a user's card that can make a payment. As a non-limiting example, the card information may include card numbers, card security codes, the user's personal identification number (PIN) for the card, the card's expiration date, and the user's name on the card, and the like. In another embodiment, the user activity data 112 may include user vehicle information. For the purposes of this disclosure, "user vehicle information" is information of a user's vehicle. As a non-limiting example, the user vehicle information may include make, manufacture country, model, model version, model year, manufacturer, country of manufacturer, body type, color, coating, steering type, wheel type, tire size, tire type, number of wheels, standard seat number, optional seat number, engine, engine capacity, fuel type, fuel tank capacity, average fuel consumption, maximum permissible weight, vehicle height, vehicle length, vehicle width, vehicle status, such as but not limited to damage status, contamination status, and the like, presence of vehicle accessories, title records, theft records, accident records, insurance records, vehicle ID, interior fabric, and the like. Additional disclosure related to the user vehicle information may be found in U.S. patent application Ser. No. 18/195,760, filed on May 10, 2023, entitled "APPARATUS AND METHOD OF VEHICLE PROFILING," the entirety of which is incorporated as a reference.

With continued reference to FIG. 1, in some embodiments, user activity data 112 may include user system activity data. For the purposes of this disclosure, "user system activity data" is data related to user's activity in a vehicle maintenance system. As a non-limiting example, the user system activity data may include products purchased by the user. As another non-limiting example, the user system activity data may include a service of the vehicle maintenance system used by the user. As another non-limiting example, the user system activity data may include a price of services and/or products the user uses and/or purchases. For example and without limitation, the user system activity data may include data related to washing a vehicle, wiping the vehicle, vacuuming, purchasing products for cleaning, repairing and/or maintenance of the vehicle, using a vending machine, using a service from the vehicle maintenance system such as but not limited to cleaning, repairing and/or maintenance of the vehicle, using an automatic car wash, using a self car wash, inflating a tire of the vehicle, changing oil of the vehicle, and the like. In some embodiments, the user activity data 112 may include a date of a transaction, items or services purchased, quantity or price of the items, the payment method, the total amount paid, location of a user device, and the like.

With continued reference to FIG. 1, in an embodiment, a data extraction module 120 may include tokenization. As a non-limiting example, the tokenization may break a document into smaller chunks called tokens, which can then be analyzed or manipulated. In some embodiments, the tokenization may break down sentences of the document into words or phrases. In another embodiment, the data extraction module 120 may include parsing libraries. As a non-limiting example, the parsing libraries may include XML, JSON, or the like. These libraries can be used to extract relevant information from a structured data file. In another embodiment, the data extraction module 120 may include string manipulation. As a non-limiting example, the string manipulation may use built-in functions or regular expressions to manipulate a string of user device data 116 and extract relevant information, user activity data 112. For example, and without limitation, the at least a processor 104 may use string manipulation to extract price of a product purchased by a customer from a receipt. In another embodiment, the data extraction module 120 may use a machine learning model, the machine learning model disclosed in the entirety of this disclosure, where machine learning algorithms can be trained to recognize patterns in unstructured data and extract relevant information. In an embodiment, the data parsing may include tokenization. As a non-limiting example, the tokenization may break a document into smaller chunks called tokens, which can then be analyzed or manipulated. In some embodiments, the tokenization may break down sentences of the document into words or phrases. In an embodiment, the data parsing may include string manipulation. As a non-limiting example, the string manipulation may use built-in functions or regular expressions to manipulate a string of characters of user device data 116 and extract relevant information, user activity data 112. For example, and without limitation, the at least a processor 104 may use string manipulation to extract price of a product purchased by a customer from a receipt.

With continued reference to FIG. 1, in some embodiments, at least a processor 104 may be configured to extract user activity data 112 using an optical character recognition (OCR). For the purposes of this disclosure, an "optical character recognition" is a technology that enables the recognition and conversion of printed or written text into machine-encoded text. As a non-limiting example, the OCR may analyze image data. For example and without limitation, the image data may include an image of a receipt, document, credit card, debit card, and the like. For example and without limitation, the OCR may analyze the image of the receipt so that the data extraction module 120 may extract the user activity data 112 that includes a date of a transaction, items or services purchased, quantity or price of the items, the payment method, the total amount paid, location of a user device, and the like. In some cases, the data extraction module 120 may be configured to recognize a keyword using the OCR to find the user activity data 112. As used in this disclosure, a "keyword" is an element of word or syntax used to identify and/or match elements to each other. In some cases, the data extraction module 120 may transcribe much or even substantially all user activity data 112.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from user activity data 112 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of user activity data 112. Pre-processing process may include without limitation de-skew, de-speckle, binarization, line removal, layout analysis or "zoning," line and word detection, script recognition, character isolation or "segmentation," and normalization. In some cases, a de-skew process may include applying a convert (e.g., homography or affine convert) to the user activity data 112 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 3.

Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes user activity data 112. Since the adaptive classifier may have learned something useful a little too late to recognize characters on the first pass, a second pass may be run over the user activity data 112. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, a data extraction module 120 may be configured to extract user activity data 112 from data stored in a user database. As used in this disclosure, "user database" is a data structure configured to store data associated with a user. As a non-limiting example, the user database may store image data, data from a POS, data from a scanning device, data related to a vehicle maintenance system, and the like. In one or more embodiments, the user database may include inputted or calculated information and datum related to a user and the vehicle maintenance system. In some embodiments, a datum history may be stored in a user database. As a non-limiting example, the datum history may include real-time and/or previous inputted data related to the user and the vehicle maintenance system. As a non-limiting example, the user database may include instructions from a user, who may be an expert user, a past user in embodiments disclosed herein, or the like, where the instructions may include examples of the data related the user and the vehicle maintenance system.

With continued reference to FIG. 1, in some embodiments, an apparatus 100 may be communicatively connected with a user database. For example, and without limitation, in some cases, the user database may be local to the apparatus 100. In another example, and without limitation, the user database may be remote to the apparatus 100 and communicative with the at apparatus 100 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure the apparatus 100 connect directly, dynamically, and non-hierarchically to as many other computing devices as possible. A "network topology" as used in this disclosure is an arrangement of elements of a communication network. The network may use an immutable sequential listing to securely store the user database. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, a user database may include keywords. For example, without limitation, the keyword may include "total amount" in the instance that a user, such as but not limited to a customer, a car wash employee, sales manager, and the like, is looking for total amount of money the customer spends in a vehicle maintenance system. In another non-limiting example, the keyword may include "SUV" in an example where a vehicle of the user is a sport utility vehicle (SUV).

With continued reference to FIG. 1, in some embodiments, a user database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, a memory 108 contains instructions configuring at least a processor to classify user activity data 112 into one or more user activity data groups 132. For the purposes of this disclosure, a "user activity data group" is a set of associative user activity data. As a non-limiting example, the one or more user activity data groups 132 may include user information group, user billing information group, user vehicle group, user system activity data group, and the like. In some embodiments, the one or more user activity data groups 132 may include one or more user activity data subgroups. For the purposes of this disclosure, a "user activity data subgroup" is a subset of a user activity data group. As a non-limiting example, the user information group may include a user information subgroup of a name group, gender group, date of birth group, residency group, religion group, organ donation group, driver history group, occupation group, family group, contact information group, emergency contact group, and the like. As a non-limiting example, the user billing information group may include a user billing information subgroup of a payment method preference group, payment history group, credit card information group, debit card information group, and the like. As another non-limiting example, the user vehicle information group may include a user vehicle information subgroup of a make group, manufacture country group, model group, model version group, model year group, manufacturer group, country of manufacturer group, body type group, color group, coating group, steering type group, wheel type group, tire size group, tire type group, number of wheels group, standard seat number group, optional seat number group, engine group, engine capacity group, fuel type group, fuel tank capacity group, average fuel consumption group, maximum permissible weight group, vehicle height group, vehicle length group, vehicle width group, vehicle status group, such as but not limited to damage status group, contamination status group, and the like, presence of vehicle accessories group, title records group, theft records group, accident records group, insurance records group, vehicle ID group, interior fabric group, and the like. As another non-limiting example, the user system activity data group may include a user system activity data subgroup of a price of services group, price of products group, a date of a transaction group, items purchased group, services used group, quantity of the items group, the payment method group, the total amount paid group, location group, and the like.

With continued reference to FIG. 1, in some embodiments, user activity data 112 may be classified into the one or more user activity data groups using a user activity data classifier 136 trained with user activity data training data. For the purposes of this disclosure, a "user activity data classifier" is a machine-learning model, such as a mathematical model, neural net, or program generated by a machine learning algorithm known as a "classification algorithm," that sorts system data related inputs into categories or bins of data, outputting a plurality of system groups associated therewith. The user activity data classifier 136 disclosed herein may be consistent with a classifier disclosed with respect to FIG. 3. In some embodiments, a user activity data classifier 136 may be trained with user activity data training data correlating the system data 124 to one or more system groups. For the purposes of this disclosure, "training data" is data containing correlations that a machine-learning process may use to model relationships between two or more categories of data elements. The training data disclosed herein is further disclosed with respect to FIG. 3. In some embodiments, the system group training data may be received from one or more users, user database, external computing devices, and/or previous iterations of processing. As a non-limiting example, the system group training data may include instructions from a user, who may be an expert user, a past user in embodiments disclosed herein, or the like, which may be stored in memory and/or stored in the user database, where the instructions may include labeling of training examples.

With continued reference to FIG. 1, as a non-limiting example, a user activity data classifier 136 may be trained with user activity data training data that correlates user information to a user information group. For example and without limitation, the user activity data training data may correlate contact information of the user information to a contact information group of the user information group. As another non-limiting example, the user activity data classifier may be trained with the user activity data training data that correlates user billing information to a user billing information group. For example and without limitation, the user activity data training data may correlate credit card information of the user billing information to a credit card information group of the user billing information group. As another non-limiting example, the user activity data classifier may be trained with the user activity data training data that correlates user vehicle information to a user vehicle information group. For example and without limitation, the user activity data training data may correlate a wheel type of a vehicle of the user vehicle information to a wheel type group of the user vehicle information group. As another non-limiting example, the user activity data classifier may be trained with the user activity data training data that correlates user system activity data to a user system activity data group. For example and without limitation, the user activity data training data may correlate a list of services a user used in a vehicle maintenance system of the user system activity data to a services used group of the user system activity data group.

With continued reference to FIG. 1, a memory 108 contains instructions configuring at least a processor to convert user activity data 112 to system data 124 using a data as a function of one or more user activity data groups 132. In some embodiments, as each of the one or more user activity data groups 132 includes different types of data, a method of converting the user activity data 112 to system data 124 may various. For example and without limitation, the data converting module 140 may convert a date of a transaction (user activity data 112), MM/DD/YYYY, in a date of a transaction group in a user system activity data group (user activity data group 132) to a date of a transaction (system data 124), YYYY/MM/DD. For example and without limitation, the data converting module 140 may convert a price of services and number of services used (user activity data 112), 4 dollars and 2 times, in a price of services group and a services used group in a user system activity data group (user activity data group 132) to a total sale (system data 124), 10 dollars, by multiplying the values. For the purposes of this disclosure, a "data converting module" is a module or a software component that is configured to convert the user activity data to system data.

With continued reference to FIG. 1, for the purposes of this disclosure, "system data" is data that is converted user activity data in a desired format. In some embodiments, the system data 124 may be stored in a user database. In some embodiments, the system data 124 may be retrieved from the user database. In an embodiment, the system data 124 may include system user information. For the purposes of this disclosure, "system user information" is data that is converted from user information. As a non-limiting example, the system user information may include name, gender, date of birth, residency, religion, organ donation, driver history, occupation, family, contact information, emergency contact, and the like. In another embodiments, the system data 124 may include system user billing information. For the purposes of this disclosure, "system user billing information" is data that is converted from user billing information. As a non-limiting example, the system user billing information may include payment method preference, payment history, credit card information, debit card information, and the like. As a non-limiting example, the card information may include card numbers, card security codes, the user's personal identification number (PIN) for the card, the card's expiration date, and the user's name on the card, and the like. In another embodiment, the system data 124 may include system user vehicle information. For the purposes of this disclosure, "system user vehicle information" is data that is converted from user vehicle information. As a non-limiting example, the system user vehicle information may include make, manufacture country, model, model version, model year, manufacturer, country of manufacturer, body type, color, coating, steering type, wheel type, tire size, tire type, number of wheels, standard seat number, optional seat number, engine, engine capacity, fuel type, fuel tank capacity, average fuel consumption, maximum permissible weight, vehicle height, vehicle length, vehicle width, vehicle status, such as but not limited to damage status, contamination status, and the like, presence of vehicle accessories, title records, theft records, accident records, insurance records, vehicle ID, interior fabric, and the like.

With continued reference to FIG. 1, in some embodiments, system data 124 may include system user system activity data. For the purposes of this disclosure, "system user system activity data" is data that is converted from user system activity data. As a non-limiting example, the system user system activity data may include products purchased by the user. As another non-limiting example, the system user system activity data may include a service of the vehicle maintenance system used by the user. As another non-limiting example, the user system activity data may include a price of services and/or products the user uses and/or purchases. For example and without limitation, the system user system activity data may include data related to washing a vehicle, wiping the vehicle, vacuuming, purchasing products for cleaning, repairing and/or maintenance of the vehicle, using a vending machine, using a service from the vehicle maintenance system such as but not limited to cleaning, repairing and/or maintenance of the vehicle, using an automatic car wash, using a self car wash, inflating a tire of the vehicle, changing oil of the vehicle, and the like. In some embodiments, the system data 124 may include a date of a transaction, items or services purchased, quantity or price of the items, the payment method, the total amount paid, location of a user device, and the like.

With continued reference to FIG. 1, in some embodiments, a data converting module 140 may include reformatting user activity data 116, translating the user activity data 112 into a different coding scheme, or applying other data converting techniques. In some embodiments, the data converting module 140 may be configured to ensure that the user activity data 112 can be converted to system data 124 within one entity and used to support various business processes or analytical activities. In some embodiments, the data converting module may be configured to ensure that the user activity data 112 can be effectively integrated into one entity to another entity and used to support various business processes or analytical activities. As a non-limiting example, the system data 124 may be used to generate a user activity report 128 as shown below. The process of data converting may include several steps, including data cleaning, data mapping, and data loading.

With continued reference to FIG. 1, in some embodiments, a data converting module 140 may include data cleaning. For the purposes of this disclosure, "data cleaning" is the process of identifying and correcting or removing errors and inconsistencies in data. In some embodiments, data cleaning may include analyzing user activity data 112 to identify any missing or incomplete values, outliers, or inconsistencies. As a non-limiting example, the data converting module 140 may be configured to compare first user activity data 112 in a first user activity data group 132 with second user activity data 112 in a second user activity data group 132 to identify any discrepancies or inconsistencies. For example and without limitation, the data converting module 140 may compare a name of a user (first user activity data 112) in a user information group (first user activity data group 132) and a name of a user (second user activity data 112) in a credit card information group (second user activity data group 132) and identify the inconsistencies of the data. As another non-limiting example, the data converting module 140 may include predefined validation rules that check for common data errors or inconsistencies, such as formatting errors, invalid values, or out-of-range values. As another non-limiting example, the data converting module 140 may include statistical analysis that may detect outliers, unusual patterns or trends, or inconsistencies in the data. In some cases, the data converting module 140 may flag the missing data and prompt a user to input the necessary information. In other cases, the data converting module 140 may infer the missing data based on other available information or use statistical techniques to estimate the missing values. As a non-limiting example, the statistical techniques may include mean imputation, regression imputations, k-nearest neighbor imputation, expectation-maximization (EM) algorithm, or the like. In some cases, the data converting module 140 may exclude the data with missing values from analysis altogether to generate a user activity report 128. In some embodiments, data cleaning may include removing duplicates, correcting spelling mistakes and formatting the user activity data 112 in a consistent manner. In some embodiments, data cleaning may include checking the user activity data 112 for accuracy and consistency, such as checking that all values fall within a specified range.

With continued reference to FIG. 1, in some embodiments, the data converting module 140 may include data mapping. For the purposes of this disclosure, "data mapping" is the process of defining the relationships between data elements in different entities. In some embodiments, data mapping may include mapping fields, defining the data types and formats to be used, and identifying any transformations or conversions that are necessary. In some embodiments, the data converting module 140 may include data enrichment. For the purposes of this disclosure, "data enrichment" is adding additional data into system data. In some embodiments, the data enrichment may include collecting and analyzing additional data from various sources, such as social media, news articles, or demographic information, and integrating it with the system data 124 to create a more comprehensive dataset. As a non-limiting example, the data enrichment may include adding geographic data or demographic data.

With continued reference to FIG. 1, in some embodiments, additional data for system data 124 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, an apparatus 100 may generate a web crawler to scrape the additional data for the system data 124 from social media sites, blogs, or the like. The web crawler may be seeded and/or trained with a reputable website, such as Twitter, to begin the search. A web crawler may be generated by a computing device of the apparatus 100. In some embodiments, the web crawler may be trained with information received from a user through a user interface. In some embodiments, the web crawler may be configured to generate a web query. A web query may include search criteria received from the user. For example, the user may submit a plurality of websites for the web crawler to search to data statistics from and correlate to the additional data for the system data or user activity data 112 Additionally, the web crawler function may be configured to search for and/or detect one or more data patterns. A "data pattern" as used in this disclosure is any repeating forms of information. A data pattern may include repeating pecuniary strategies, repeating service strategies, and the like. In some embodiments, the web crawler may be configured to determine the relevancy of a data pattern. Relevancy may be determined by a relevancy score. A relevancy score may be automatically generated by the computing device of the apparatus 100, received from a machine learning model, and/or received from the user. In some embodiments, the relevancy score may include a range of numerical values that may correspond to a relevancy strength of data received from a web crawler function. As a non-limiting example, a web crawler function may search the Internet for the additional data for the system data 124. The web crawler may return the additional data for the system data 124, such as, as non-limiting examples, pecuniary data, user's review of a service in a vehicle maintenance system, geographic information, demographic information, and the like.

With continued reference to FIG. 1, an apparatus 100 includes a report generation module 144. For the purposes of this disclosure, a "report generation module" is a module that is configured to generate a user activity report as a function of system data. In some embodiments, the report generation module 144 may include a variety of techniques and algorithms to analyze and summarize the system data 124 such as but not limited to data visualization, statistical analysis, and natural language processing. For the purposes of this disclosure, a "user activity report" is a compilation of user's activities that is formed to display or communicate the compilation of the user's activities. In some embodiments, the user activity report 128 may be configured for auditing or compliance purposes, such as tracking changes to the system data 124. In some embodiments, the user activity report 128 may include a form of a text, a graph, a trend line, a chart, audio, animation, an image, a video, and the like. In some embodiments, the user activity report 128 may be configured to gain insights into how users interact with an apparatus 100, identify trends or patterns in user behavior, and optimize system performance and usability. As a non-limiting example, the user activity report 128 may include an analysis of what kinds of services are mostly used by users in a specific location. As another non-limiting example, the user activity report 128 may include financial performance, marketing strategies, customer behavior, operational efficiency, and the like. As another non-limiting example, the user activity report 128 may include data insights related to sales revenue, expenses, profitability, market trends, customer demographics, competitive landscape, and more. As another non-limiting example, the user activity report 128 may include recommendations for improving the business's performance, based on the analysis conducted. As a non-limiting example, the recommendations may include changes to the company's marketing strategies, product offerings, customer experience, operations, financial management practices, and the like. In some embodiments, the report generation module 144 may be configured to generate the user activity report 128 as a function of one or more system groups. As a non-limiting example, the customer demographics of the user activity report 128 may be generated as a function of a user information group and/or user vehicle information group of the one or more system groups. As another non-limiting example, the sale revenue of the user activity report 128 may be generated as a function of a user system activity data group of the one or more system groups.

With continued reference to FIG. 1, in some cases, generating a user activity report 128 may include linear regression techniques. As a non-limiting example, the user activity report 128 may include how user behavior changes over time, how certain user demographics tend to use a vehicle maintenance system differently, and the like described above. At least a processor 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, in an embodiment, a user activity report 128 may be read-only. In another embodiment, the user activity report 128 may be writable. In some embodiments, the writable user activity report may require authentication; for instance without limitation, the writable user activity report may be writable only given a unique identifier indicating that the device that will be modifying the user activity report 128 is authorized. In some embodiments, the user activity report 128 may include any combination of the above; for instance without limitation, the user activity report 128 may include a read-only section. For example without limitation, the user activity report 128 may include a writable section with limited access. In some embodiments, the user activity report 128 may include a writable section with general access, to which any user may be able to input data. The user activity report 128 may include the read-only section and the generally writable section, or the limited access writable section and the generally writable section, or the read-only section and the limited access section. The limited access section may be limited to users of the apparatus 100, or in other words may be generally writable, but only to users of the apparatus 100, who may have the unique identifier; the users may alternatively be granted the unique identifier by the apparatus 100 to update data only when authorized by the system, and otherwise be unable to update the user activity report 128. In some embodiments, preventing users from being able to write over a user activity report 128 enables the user activity report 128 to be free from intentional or unintentional corruption or inaccuracy, and enables the apparatus 100 to ensure that certain information is always available to users. In some embodiments, writable sections enable the apparatus 100 itself or users of the apparatus 100 to correct, augment, or update information.

Figure 2:
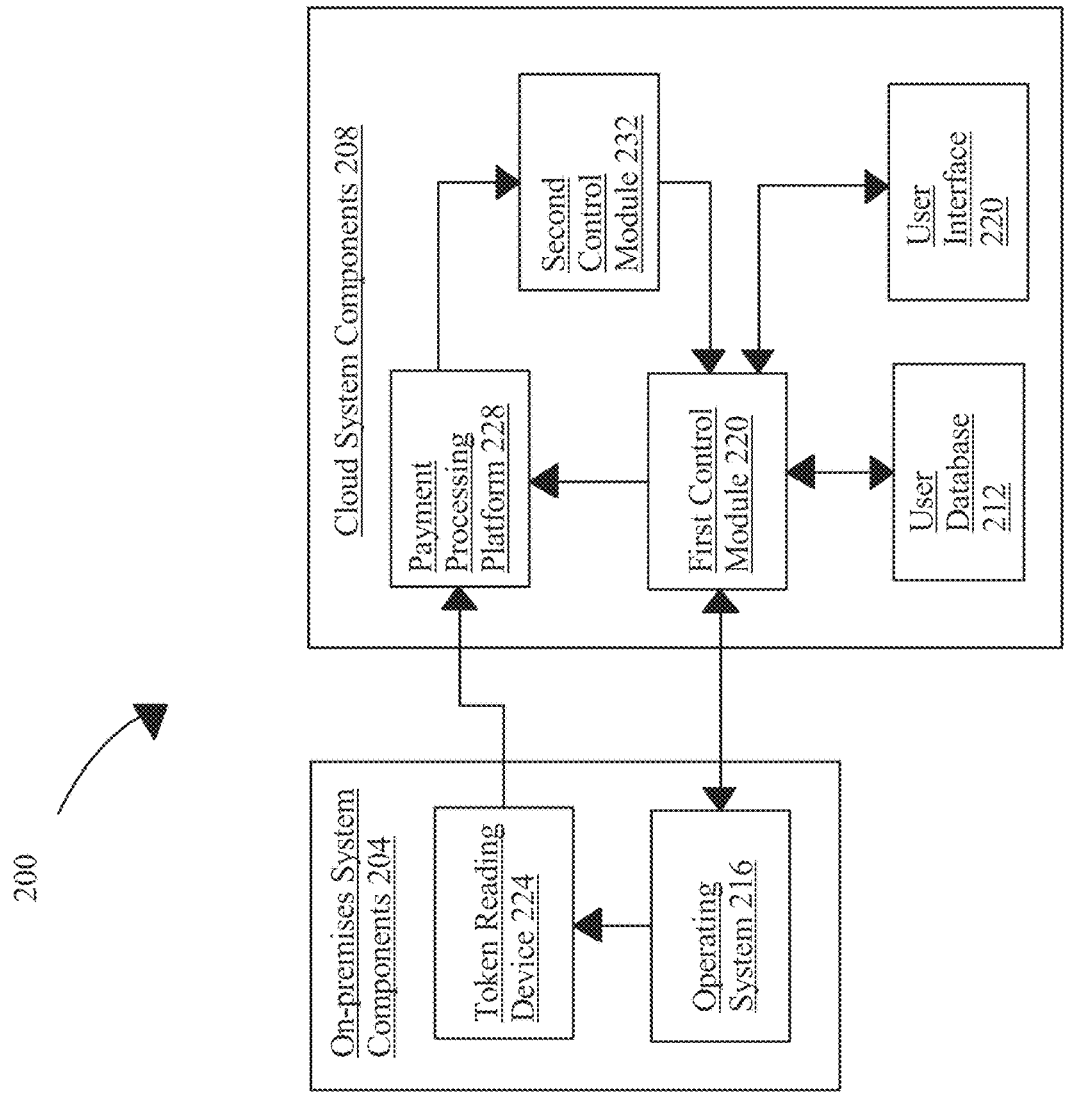
FIG. 2 illustrates a high-level system architecture of payment processing system.

Referring now to FIG. 2, a high-level system architecture of payment processing system 200 is shown. In some embodiments, payment processing system 200 may be implemented in any infrastructure or system. As a non-limiting example, payment processing system 200 may be implemented in a vehicle maintenance system, where the vehicle maintenance system is described further in detail above. Additionally, vehicle maintenance system disclosed herein may be consistent with a vehicle care site found in application Ser. No. 18/196,205, filed on May 11, 2023, entitled "SYSTEM AND METHOD FOR PROVIDING A SEAMLESS VEHICLE CARE AT A VEHICLE CARE SITE," the entirety of which is disclosed as a reference. Payment processing system 200 may include plurality of on-premises system components 204. As used in this disclosure, "on-premises system components" are components (e.g., computing infrastructure, software, or hardware) that are installed, hosted, and maintained within physical location of vehicle maintenance system. In an embodiment, vehicle maintenance system may be responsible for the management, maintenance, security, and operation of plurality of on-premises system components 204. Exemplary embodiments of on-premises system components are described below in further detail.

With continued reference to FIG. 2, in some embodiments, payment processing system 200 may include plurality of cloud system components 208. As used in this disclosure, "cloud system components" are components (e.g., computing infrastructure, software, or hardware) that are installed, hosted, and maintained on a cloud environment. As used in this disclosure, a "cloud environment" is a set of systems and/or processes acting together to provide services in a manner that is dissociated with underlaying hardware and/or software within apparatus 100 used for such purpose and includes a cloud. A "cloud," as described herein, refers to one or more servers that are accessed over the network. In some cases, cloud may include Hybrid Cloud, Private Cloud, Public Cloud, Community Cloud, any cloud defined by National Institute of Standards and Technology (NIST), and the like thereof. In some embodiments, cloud may be remote to apparatus 100; for instance, cloud may include a plurality of functions distributed over multiple locations outside apparatus 100. Location may be a data center. In a non-limiting example, data extraction module 120, data converting module 140, report generation module 144, and/or user database 212 may run on one or more cloud servers.

With continued reference to FIG. 2, cloud system components 208 may include implementation of cloud computing. As used in this disclosure, "cloud computing" is an on-demand delivery of information technology (IT) resources within a network through internet, without direct active management by either first entity or second entity. In an embodiment, without limitation, cloud system components 208 may include a Software-as-a-Service (SaaS). As used in this disclosure, a "Software-as-a-Service" is a cloud computing service model which make software available to apparatus 100 directly; for instance, SaaS may deliver ready-to-use software applications over the network, accessible via internet applications (e.g., web browsers or specialized client applications). In some cases, cloud computing may implement various security measure, such as data encryption, identify and access management, network security, and/or the like to protect the infrastructure and data such as, without limitation, user device data 116. In a non-limiting example, apparatus 100 may include a network component that enable secure and reliable connectivity between data and end users, wherein the network component may include, without limitation, virtual private networks (VPNs), local balancers, content delivery networks (CDNs), and/or the like. Additionally, or alternatively, cloud system components 208 may include tools and/or services for monitoring, logging, and managing the performance, security and availability of cloud resources.

With continued reference to FIG. 2, payment processing system 200 may include an operating system 216. As used in this disclosure, an "operating system" refers to the fundamental software that manages and controls various system components. In an embodiment, operating system 216 may be responsible for executing any processing steps as described in this disclosure. In a non-limiting example, operating system 216 may allocate system resources (e.g., processing power, memory, and/or storage) among various system components and manage the execution of commands, coordinating the communication between a control module. The control module disclosed herein may be consistent with a control module found in application Ser. No. 18/196,205, filed on May 11, 2023, entitled "SYSTEM AND METHOD FOR PROVIDING A SEAMLESS VEHICLE CARE AT A VEHICLE CARE SITE," the entirety of which is disclosed as a reference.

With continued reference to FIG. 2, operating system 216 may communicate with a first control module 220, wherein the first control module 220 may be a control module hosted on cloud environment as described above. User interface 220 may communicate with first control module 220. In some embodiments, user interface 220 may be consistent with user device, where user device is further described in detail with respect to FIG. 1. In a non-limiting example, user may use user interface 220 for user authentication to gain access to vehicle maintenance system and/or plurality of devices within the vehicle maintenance system. User interface 220 may allow user to enter user input containing user authentication datum, wherein the user authentication datum may be verified by a validation module. In some cases, validation module may be a cloud system component; for instance, and without limitation, validation module may include a cloud identify provider (IDP) configured to delivers identity and access management (IAM) functionality as a SaaS. First control module 220 may communicate with user database 212 to enable validation module to access plurality of data. In this case, user database 212 may include a cloud storage. Additional disclosure related to validation disclosed herein may be found in application Ser. No. 18/196,205, filed on May 11, 2023, entitled "SYSTEM AND METHOD FOR PROVIDING A SEAMLESS VEHICLE CARE AT A VEHICLE CARE SITE," the entirety of which is disclosed as a reference.

With continued reference to FIG. 2, operating system 216 may communicate with one or more token reading device 224 via Bluetooth Low Energy (BLE). In a non-limiting example, token reading device 224 may include a card reader, wherein the card reader is a device used to read and extract data from various types of cards, such as, without limitation, credit cards, debit cards, smart cards, magnetic strip cards, and/or the like. In some embodiments, token reading device 224 disclosed herein may be consistent with a scanning device described in detail with respect to FIG. 1. In a non-limiting example, token reading device 224 may be configured to process an electronic payment transaction, enabling access to plurality of devices and/or cares within a vehicle maintenance system.

With continued reference to FIG. 2, cloud system components 208 may include a payment processing platform 228. For the purposes of this disclosure, a "payment processing platform" is a software or service that facilitate payment transactions between businesses and their customers. In some embodiments, payment processing platform 228 may facilitate payment transactions between a vehicle maintenance system and a user. In some embodiments, token reading device 224 may communicate with payment processing platform 228. In a non-limiting example, token reading device 224 may receive and/or transmit user device data 116 and/or user activity data 112 to payment processing platform 228. In a non-limiting example, payment processing platform 228 may receive and/or transmit user device data 116 to second control module 232. In some cases, payment processing platform 228 may be a cloud system component; for instance, and without limitation, payment processing platform 228 may include a set of Application Programming Interfaces (APIs) configured for processing online payment. APIs may include a third-party ($3^{rd}$ party) payment processing APIs. As another non-limiting example, payment processing platform 228 may include PayPal, Stripe, Square, Authorize.Net, Venmo, or the like.

With continued reference to FIG. 2, in some embodiments, cloud system components 208 may include a second control module 232, where second control module 232 may process or manage data between payment processing platform 228 and first control module 220. In some embodiments, second control module 232 may receive any transactions, payments, user device data 116 and/or user activity data 112 and manage them. In some embodiments, second control module 232 may include apparatus 100. In some embodiments, second control module 232 may be consistent with apparatus 100. In a non-limiting example, second control module 232 may convert user device data 116 and/or user activity data 112 to system data 124. In another non-limiting example, second control module 232 may transmit user data 116, user activity data 112, system data 124 and/or any data to first control module 220. In another non-limiting example, second control module 232 may generate a command for first control module 220. For example, and without limitation, user may make a single purchase in vehicle maintenance system, then second control module 232 may receive data related to the single purchase and process, store, transmit the data. For example, and without limitation, user may make multiple purchases in vehicle maintenance system, then second control module 232 may receive data related to the multiple purchases and process, store, transmit the data. For example, and without limitation, user may create a membership for using vehicle maintenance system, then second control module 232 may receive the data and process, store, transmit the data such as, but not limited to, generating a command to create a membership and transmit the command to first control module 220. For example, and without limitation, user who has a membership for using vehicle maintenance system may make a single purchase, where information of the purchase is stored in the membership and retrieved for the user to allow for making the same purchase. As a non-limiting example, information of purchases may be stored in user database 212. In a non-limiting example, information of purchases may be retrieved from user database 212. For example, and without limitation, user who has a membership for using vehicle maintenance system may make a new single purchase, where information of the purchase is not stored in the membership. For example, and without limitation, user who has a membership for using vehicle maintenance system may make multiple purchases, where information of the purchases is stored in the membership and retrieved for the user to allow for making the same purchase. For example, and without limitation, user who has a membership for using vehicle maintenance system may make multiple purchases, where information of the purchases is not stored in the membership. As a non-limiting example, the command generated for first control module may include create/subscribe to a new membership, retrieve membership status, update membership status, deleting/unsubscribe membership, store payment or transaction, retrieve payment or transaction, process payment or transaction, or the like. In some embodiments, membership may allow user to access user activity data 112, payment/transaction information, payment/transaction history, membership status, or the like.

With continued reference to FIG. 2, in some embodiments, cloud system components 208 may include a first control module 220. In a non-limiting example, first control module 220 may be configured to manage membership-related data (e.g., create/subscribe to a new membership, retrieving membership status, updating membership status, deleting/unsubscribe membership) using payment processing platform 228 and/or second control module 232 communicatively connected to first control module 220 by utilizing one or more STRIPE APIs. In another non-limiting example, first control module 220 may be configured to manage payment/transaction-related data using payment processing platform 228 and/or second control module 232 communicatively connected to first control module 220 by utilizing one or more STRIPE APIs. In some embodiments, cloud system components 208 may include user database 212. User database 212 disclosed herein may be consistent with user database described with respect to FIG. 1. In some embodiments, cloud system components 208 may include a user interface 220. In some embodiments, user interface 220 may be consistent with user device described with respect to FIG. 1. In some embodiments, user may view any data using user interface 220. In some embodiments, user may make a payment using user interface 220. In some embodiments, user may manage a membership for using a vehicle maintenance system using user interface 220. Additional disclosure related to first control module 220 and user interface 220 may be found in application Ser. No. 18/196,205, filed on May 11, 2023, entitled "SYSTEM AND METHOD FOR PROVIDING A SEAMLESS VEHICLE CARE AT A VEHICLE CARE SITE," the entirety of which is disclosed as a reference.

Figure 3:
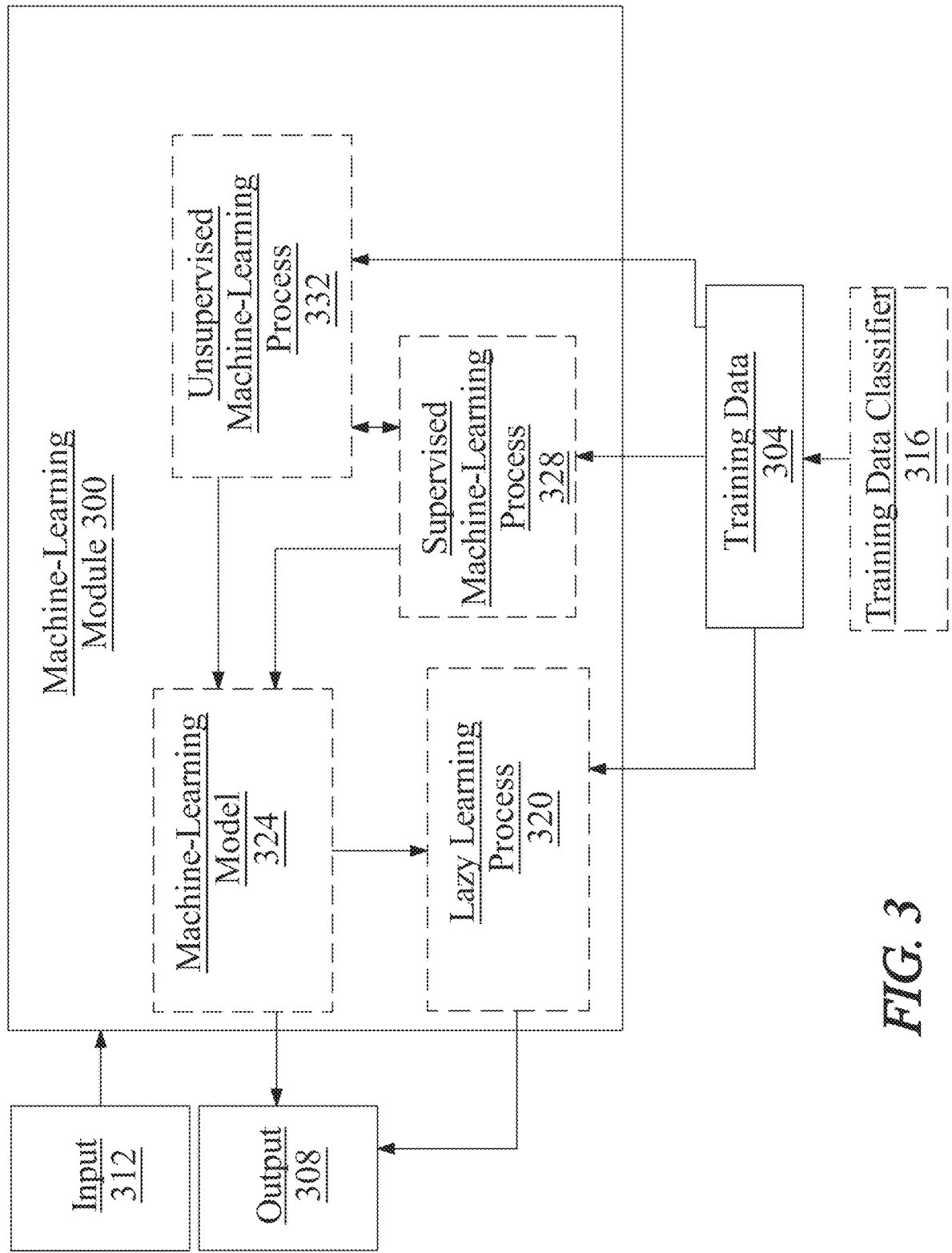
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

With continued reference to FIG. 3, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

With continued reference to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or Ie Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With continued reference to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
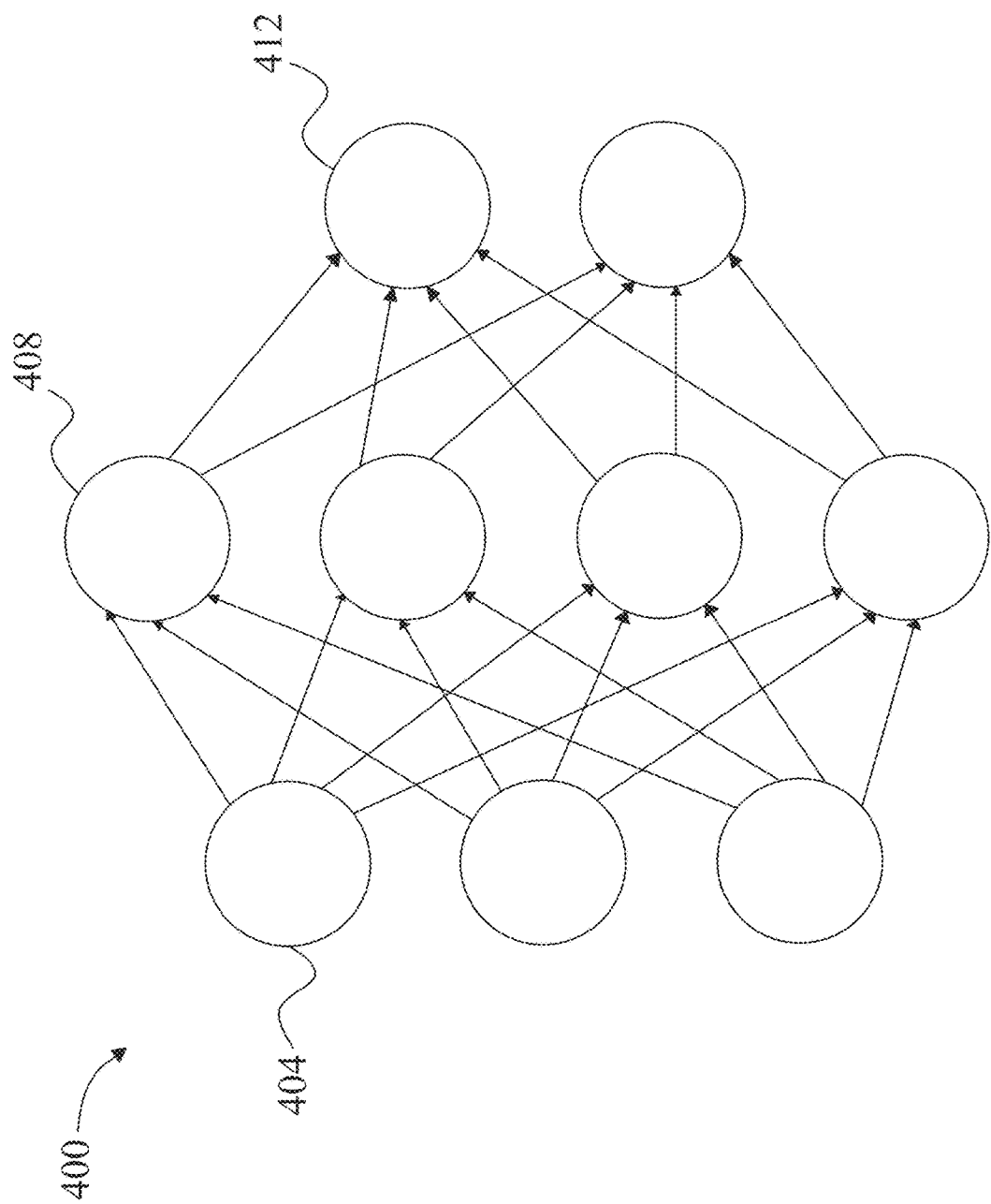
FIG. 4 is a diagram of an exemplary nodal network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
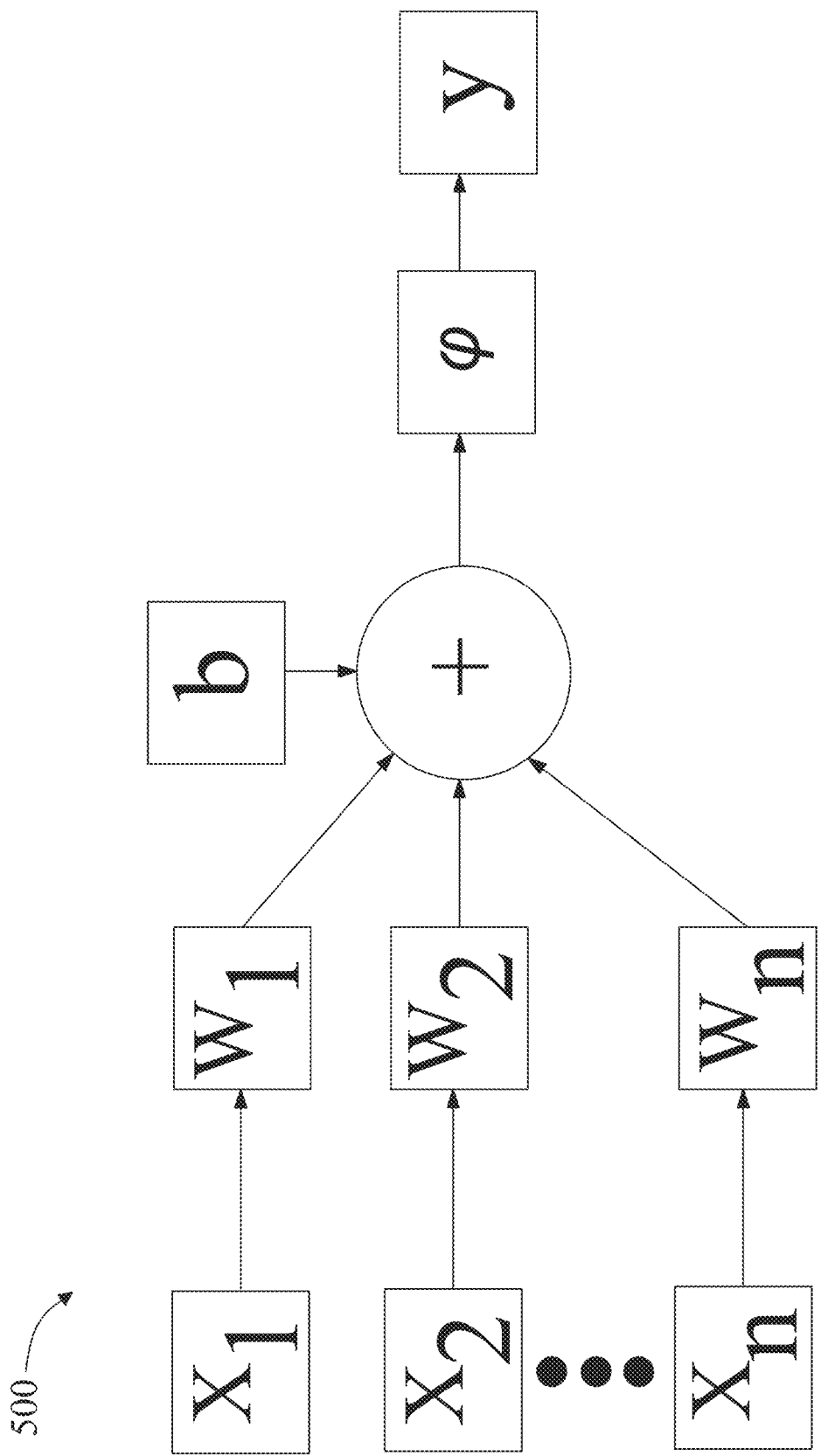
FIG. 5 is a block diagram of an exemplary node.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
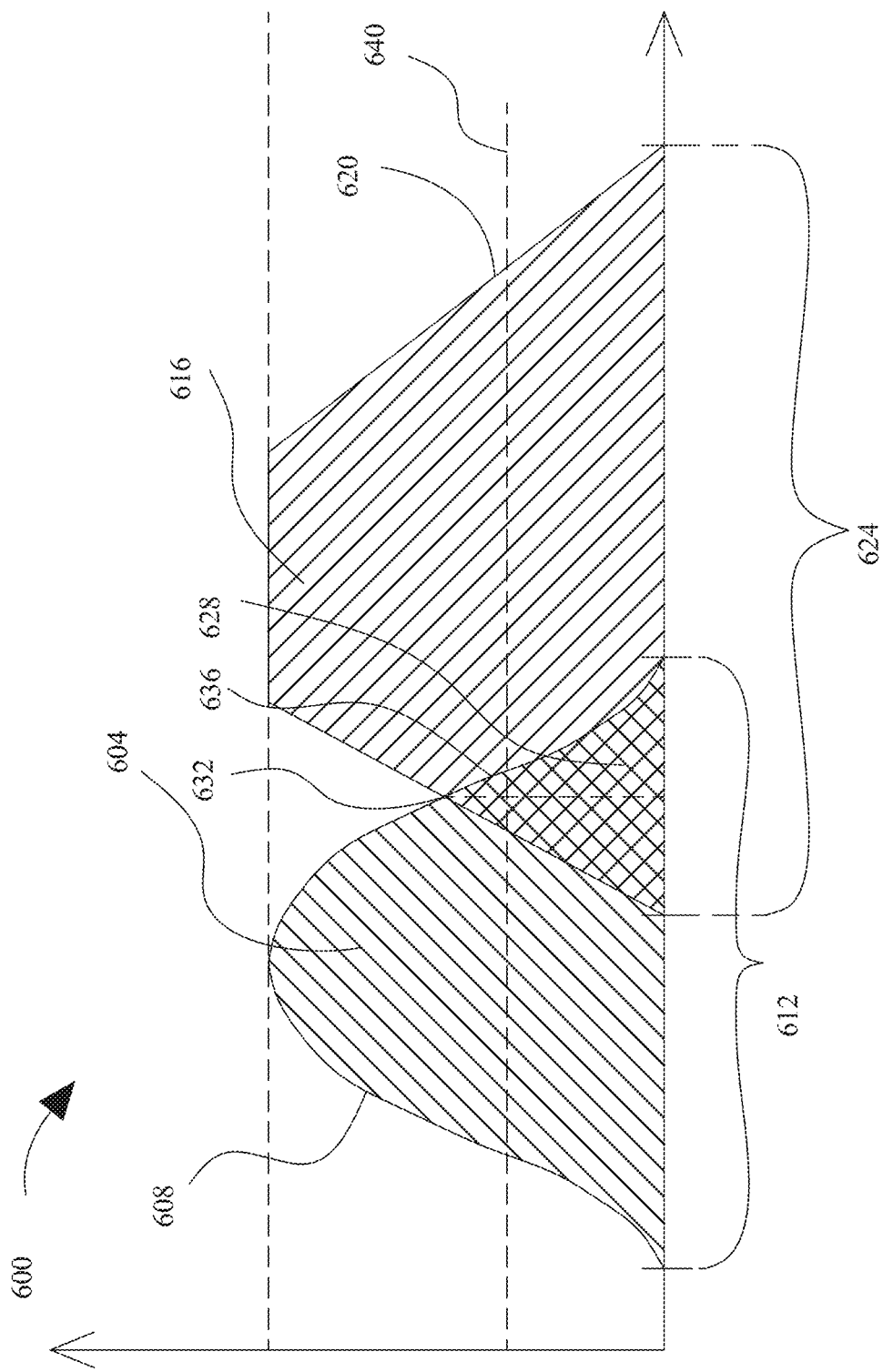
FIG. 6 is a block diagram of a fuzzy set system.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{3}\left(\frac{x-c}{\sigma}\right)^3}$$

and a bell membership function may be defined as:

$$y(x, a, b, c,) = \left[1 + \left|\frac{x-c}{a}\right|^{3b}\right]^{-1}$$

Persons skilled in the art, upon reviewing the entirety of this disclosure, will be aware of various alternative or additional membership functions that may be used consistently with this disclosure.

With continued reference to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or an assessed vehicle status groups, alone or in combination. Alternatively or additionally, each threshold may be tuned by a machine-learning and/or statistical process, for instance and without limitation as described in further detail below.

With continued reference to FIG. 6, in an embodiment, vehicle data and/or vehicle status and/or user interest data may be compared to multiple vehicle status groups fuzzy sets. For instance, user profile may be represented by a fuzzy set that is compared to each of the multiple vehicle status group fuzzy sets; and a degree of overlap exceeding a threshold between the vehicle status fuzzy set and any of the multiple vehicle status groups fuzzy sets may cause processor to rank vehicle status groups as a function of the vehicle data and/or vehicle status. For instance, in one embodiment there may be two vehicle status group fuzzy sets, representing respectively a first vehicle status group and a second vehicle status group. First vehicle status group may have a first fuzzy set; and Second vehicle status group may have a second fuzzy set. Processor 104, for example, may compare a vehicle data and/or vehicle status fuzzy set with each of the first and second vehicle status group fuzzy sets, as described above, and classify a user profile to either, both, or neither of the first and second vehicle status groups. Machine-learning methods as described throughout may, in a non-limiting example, generate coefficients used in fuzzy set equations as described above, such as without limitation x, c, and σ of a Gaussian set as described above, as outputs of machine-learning methods. Likewise, vehicle data and/or vehicle status may be used indirectly to determine a fuzzy set, as vehicle data and/or vehicle status fuzzy set may be derived from outputs of one or more machine-learning models that take the vehicle data and/or vehicle status such as products and/or data directly or indirectly as inputs.

With continued reference to FIG. 6, a computing device may use a logic comparison program, such as, but not limited to, a fuzzy logic model to determine a correlation between a plurality of vehicle data and/or vehicle status and a plurality of vehicle status groups. A correlation between vehicle data and/or vehicle status and vehicle status groups may include, but is not limited to, irrelevant, poor, average, high, and the like; each such designation may be represented as a value for a linguistic variable representing correlation, or in other words, a fuzzy set as described above that corresponds to a degree of positive correlations as calculated using any statistical, machine-learning, or other method that may occur to a person skilled in the art upon reviewing the entirety of this disclosure. In other words, a given element of vehicle data and/or vehicle status object may have a first non-zero value for membership in a first linguistic variable value such as a high correlation and a second non-zero value for membership in a second linguistic variable value such as average correlation. In some embodiments, determining a correlation may include using a linear regression model. A linear regression model may include a machine learning model. A linear regression model may be trained using a machine learning process. A linear regression model may map statistics such as, but not limited to, degree of similarity with respect to the type of vehicle data and/or vehicle status and vehicle status groups. In some embodiments, determining a correlation between vehicle data and/or vehicle status and vehicle status groups may include using a classification model. The classification model may be configured to input collected data and cluster data to a centroid based on, but not limited to, frequency of appearance, linguistic indicators of correlation, and the like.

Centroids may include scores assigned to them such that level of correlation of vehicle data and/or vehicle status and vehicle status groups may each be assigned a score. In some embodiments, the classification model may include a K-means clustering model. In some embodiments, the classification model may include a particle swarm optimization model. In some embodiments, determining the classification model may include using a fuzzy inference engine. A fuzzy inference engine may be configured to map one or more elements of vehicle data and/or vehicle status and vehicle status group data using fuzzy logic. In some embodiments, vehicle data and/or vehicle status and vehicle status groups may be arranged by a logic comparison program into various levels of correlation arrangements. A "correlation arrangement" as used in this disclosure is any grouping of objects and/or data based on degree of match based on vehicle status group assessment. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure. Additionally and/or alternatively, the fuzzy set may be incorporated with vehicle data and/or vehicle status.

Figure 7:
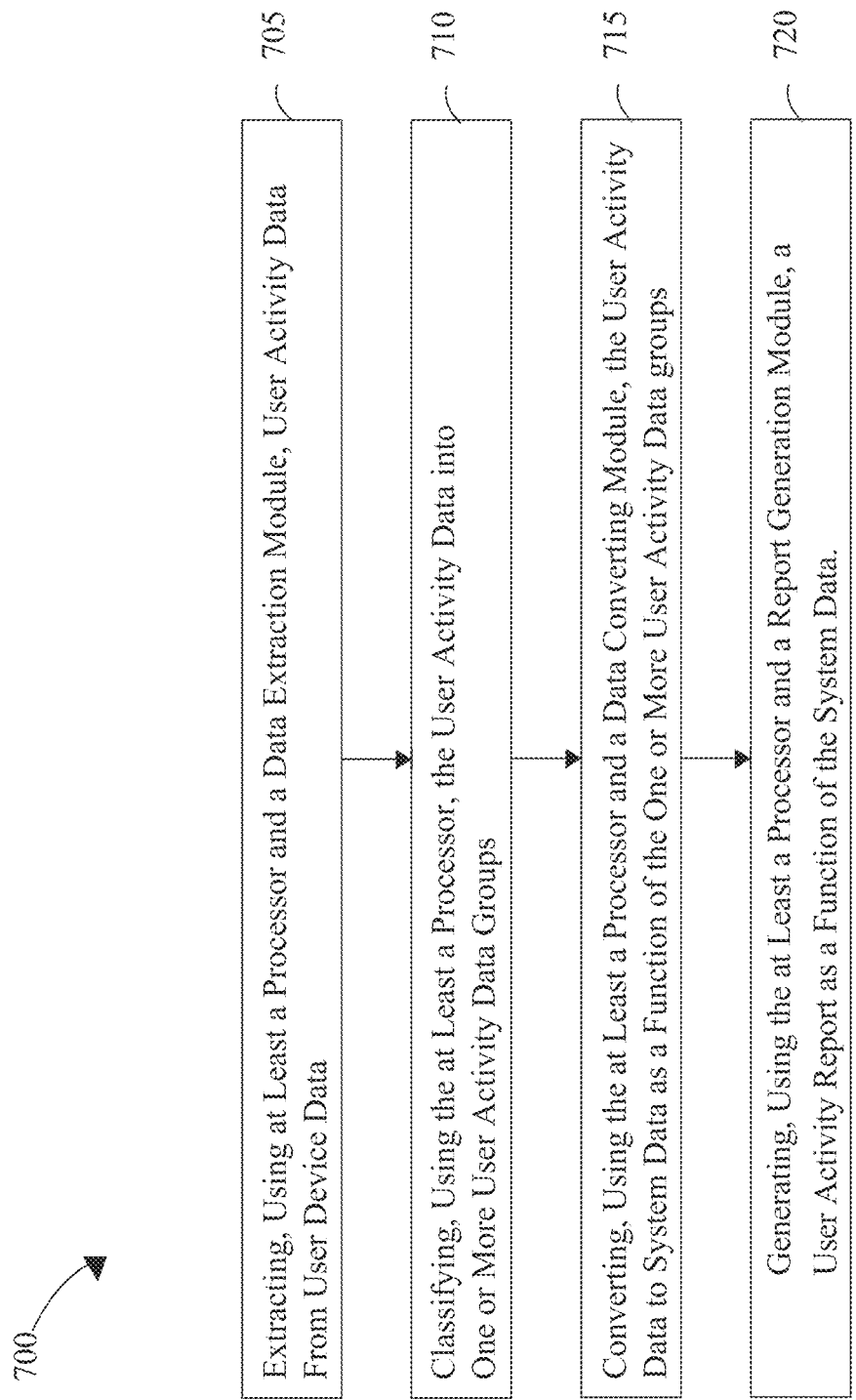
FIG. 7 is a flow diagram illustrating an exemplary method for converting data.

Referring now to FIG. 7, a flow diagram of an exemplary method 700 for converting data is illustrated. The method 700 includes a step 705 of extracting, using at least a processor and a data extraction module, user activity data from user device data. In some embodiments, the user activity data may include user information. In some embodiments, the user activity data may include user activity information. In some embodiments, the user activity data may include user system activity data. In some embodiments, the user activity data may include user vehicle information. In some embodiments, the method 700 may further include extracting, using the at least a processor, the user activity data using an optical character recognition. In some embodiments, the method 700 may further include identifying, using the at least a processor, strings of characters of the user device data and extracting, using the at least a processor, the user activity data as a function of the strings of characters of the user device data. This may be implemented as a reference to FIGS. 1-6.

With continued reference to FIG. 7, a method 700 includes a step 710 of classifying, using at least a processor, user activity data into one or more user activity data groups. In some embodiments, the method 700 may further include classifying, using the at least a processor, the user activity data into the one or more user activity data groups using a user activity data classifier 136 trained with user activity data training data, wherein the user activity data training data correlates the user activity data with the one or more user activity data group. This may be implemented as a reference to FIGS. 1-6.

With continued reference to FIG. 7, a method 700 includes a step 715 of converting, using at least a processor and a data converting module, user activity data to system data as a function of one or more user activity data groups. In some embodiments, the method 700 may further include comparing, using the at least a processor, first user activity data of the user activity data and second user activity data of the user activity data and identifying, using the at least a processor, an inconsistency between the first user activity data and the second user activity data. This may be implemented as a reference to FIGS. 1-6.

With continued reference to FIG. 7, a method 700 includes a step 720 of generating, using at least a processor and a report generation module, a user activity report as a function of system data. In some embodiments, the method 700 may further include generating, using the at least a processor, the user activity report using a linear regression model. This may be implemented as a reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
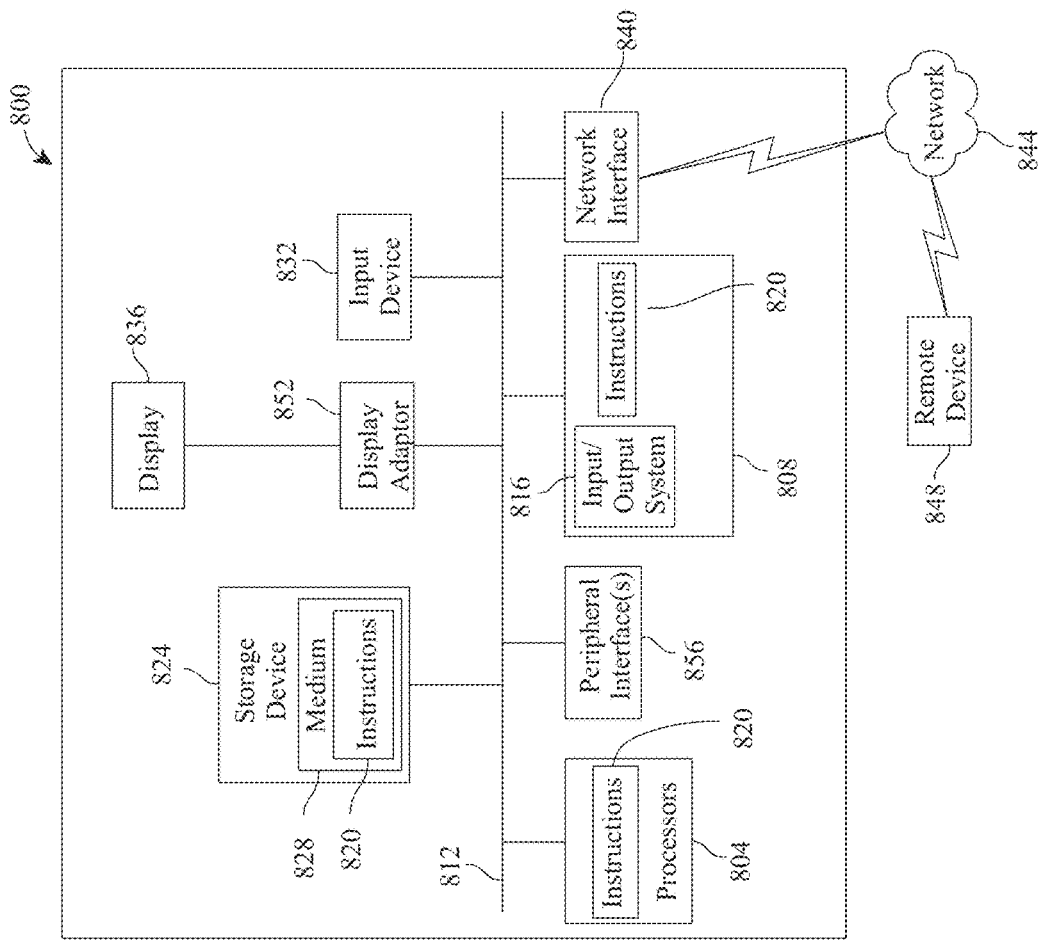
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for converting data, wherein the apparatus comprises:
    at least a processor; and
    a memory communicatively connected to the at least a processor, wherein the memory contains instructions configuring the at least a processor to:
        extract, using a data extraction module, user activity data from user device data, wherein the user activity data comprises data related to user activity in a vehicle maintenance system;
        classify the user activity data into one or more user activity data groups;
        convert, using a data converting module, the user activity data to system data as a function of the one or more user activity data groups, wherein the converting module is further configured to perform a data enrichment of the system data after conversion by adding additional data to the system data, wherein the additional data is generated by performing a web indexing process comprising systematically browsing and indexing sources using a web query to retrieve demographic information;
        flag missing data of the user activity data using the data converting module;
        identify trends in user behavior as a function of the converted user activity data, wherein identifying trends in the user behavior comprises using a machine-learning model configured to identity demographics trends related to a vehicle maintenance system; and
        generate, using a report generation module, a user activity report as a function of the system data and the flagged missing data, wherein the user activity report comprises the identified trends of user behavior related to optimizing usability of the user activity data.

2. The apparatus of claim 1, wherein the user activity data comprises user information.

3. The apparatus of claim 1, wherein the user activity data comprises user activity information.

4. The apparatus of claim 1, wherein the user activity data comprises user system activity data.

5. The apparatus of claim 1, wherein the user activity data comprises user vehicle information.

6. The apparatus of claim 1, wherein the memory contains the instructions further configuring the at least a processor to extract the user activity data using optical character recognition.

7. The apparatus of claim 1, wherein the memory contains instructions further configuring the at least a processor to classify the user activity data into the one or more user activity data groups using a user activity data classifier trained with user activity data training data, wherein the user activity data training data correlates user activity data sets with user activity data groups.

8. The apparatus of claim 1, wherein the memory contains instructions further configuring the at least a processor to:
identify strings of characters of the user device data; and
extract the user activity data as a function of the strings of characters of the user device data.

9. The apparatus of claim 1, wherein the memory contains the instructions further configuring the at least a processor to:
compare first user activity data of the user activity data and second user activity data of the user activity data; and
identify an inconsistency between the first user activity data and the second user activity data.

10. A method for converting data, wherein the method comprises:
extracting, using at least a processor and a data extraction module, user activity data from user device data, wherein the user activity data comprises data related to user activity in a vehicle maintenance system;
classifying, using the at least a processor, the user activity data into one or more user activity data groups;
converting, using the at least a processor and a data converting module, the user activity data to system data as a function of the one or more user activity data groups, wherein the converting module is further configured to perform a data enrichment of the system data after conversion by adding additional data to the system data, wherein the additional data is generated by performing a web indexing process comprising systematically browsing and indexing sources using a web query to retrieve demographic information;
flagging, using the at least a processor and the data converting module, missing data of the user activity data;
identifying, using the at least a processor, trends in user behavior as a function of the converted user activity data, wherein identifying trends in the user behavior comprises using a machine-learning model configured to identity demographics trends related to a vehicle maintenance system; and
generating, using the at least a processor and a report generation module, a user activity report as a function of the system data and the flagged missing data, wherein the user activity report comprises the identified trends of user behavior related to optimizing usability of the user activity data.

11. The method of claim 10, wherein the user activity data comprises user information.

12. The method of claim 10, wherein the user activity data comprises user activity information.

13. The method of claim 10, wherein the user activity data comprises user system activity data.

14. The method of claim 10, wherein the user activity data comprises user vehicle information.

15. The method of claim 10, further comprising:
extracting, using the at least a processor, the user activity data using optical character recognition.

16. The method of claim 10, further comprising:
classifying, using the at least a processor, the user activity data into the one or more user activity data groups using a user activity data classifier trained with user activity data training data, wherein the user activity data training data correlates user activity data sets with user activity data groups.

17. The method of claim 10, further comprising:
identifying, using the at least a processor, strings of characters of the user device data; and
extracting, using the at least a processor, the user activity data as a function of the strings of characters of the user device data.

18. The method of claim 10, further comprising:
comparing, using the at least a processor, first user activity data of the user activity data and second user activity data of the user activity data; and
identifying, using the at least a processor, an inconsistency between the first user activity data and the second user activity data.

* * * * *